(12) United States Patent
Xu et al.

(10) Patent No.: US 11,194,999 B2
(45) Date of Patent: Dec. 7, 2021

(54) INTEGRATED FACIAL RECOGNITION METHOD AND SYSTEM

(71) Applicant: Beijing Baidu Netcom Science and Technology Co., Ltd., Beijing (CN)

(72) Inventors: Tianhan Xu, Beijing (CN); Faen Zhang, Beijing (CN); Kai Zhou, Beijing (CN); Qian Wang, Beijing (CN); Kun Liu, Beijing (CN); Yuanhao Xiao, Beijing (CN); Dongze Xu, Beijing (CN); Jiayuan Sun, Beijing (CN); Lan Liu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 357 days.

(21) Appl. No.: 16/102,924

(22) Filed: Aug. 14, 2018

(65) Prior Publication Data
US 2019/0080154 A1 Mar. 14, 2019

(30) Foreign Application Priority Data

Sep. 11, 2017 (CN) .......................... 201710811916.9

(51) Int. Cl.
| G06K 9/00 | (2006.01) |
| G06K 9/62 | (2006.01) |
| G06K 9/46 | (2006.01) |

(52) U.S. Cl.
CPC ..... *G06K 9/00288* (2013.01); *G06K 9/00228* (2013.01); *G06K 9/00268* (2013.01);
(Continued)

(58) Field of Classification Search
CPC ............. G06K 9/00288; G06K 9/6274; G06K 9/4628; G06K 9/6256; G06K 9/00268;
(Continued)

(56) References Cited

U.S. PATENT DOCUMENTS 5,161,204 A * 11/1992 Hutcheson ......... G06K 9/00221
382/157
8,429,103 B1 * 4/2013 Aradhye ........... H04M 1/72563
706/12
(Continued)

FOREIGN PATENT DOCUMENTS

| CN | 103116754 A | 5/2013 |
| CN | 105426850 A | 3/2016 |
| CN | 107016341 A | 8/2017 |

OTHER PUBLICATIONS

Mo, Richard, and Adnan Shaout. "Portable Facial Recognition Jukebox Using Fisherfaces (Frj)." International Journal of Advanced Computer Science and Applications 7, No. 3 (2016): 9-14. (Year: 2016).*

(Continued)

Primary Examiner — Carol Wang
(74) Attorney, Agent, or Firm — Nixon Peabody LLP

(57) ABSTRACT

An integrated facial recognition method and system. The method includes: receiving a request for acquiring an integrated facial recognition service sent by a user terminal, which includes: an identifier of a user-selected model associated with facial recognition of the user, and an identifier of an operation selected by the user from candidate operations; and executing distributedly an operation selected by the user from the candidate operations on the user-selected model associated with the facial recognition of the user to obtain an operation result, and storing the operation result. The embodiment has realized completing the operations such as training a model or developing a facial recognition application, without the need of buying hardware and establishing a software environment by the user, thereby saving the development cost and improving the convenience of using the facial recognition service.

10 Claims, 5 Drawing Sheets receive a request for acquiring an integrated face recognition service sent by a user terminal — 201 execute distributedly an operation selected by the user from the candidate operations on the user-selected model associated with the face recognition of the user to obtain an operation result, and storing the operation result — 202

(52) U.S. Cl.
CPC ......... *G06K 9/4628* (2013.01); *G06K 9/6256* (2013.01); *G06K 9/6274* (2013.01)

(58) Field of Classification Search
CPC .............. G06K 9/00228; G06F 16/583; H04L 63/0815; H04L 63/0861; H04L 67/32
See application file for complete search history.

(56) References Cited

U.S. PATENT DOCUMENTS

| | | | |
|---|---|---|---|
| 9,740,920 B1* | 8/2017 | Chang | G06K 9/00288 |
| 2006/0133671 A1* | 6/2006 | Kanatsu | G06K 9/2054 |
| | | | 382/181 |
| 2014/0092015 A1* | 4/2014 | Xing | G06K 9/00281 |
| | | | 345/158 |
| 2016/0147758 A1* | 5/2016 | Chhaya | G06F 16/437 |
| | | | 707/733 |
| 2016/0306986 A1* | 10/2016 | Zhang | H04L 63/1416 |
| 2017/0017831 A1* | 1/2017 | Rollend | G06T 5/40 |
| 2017/0286755 A1* | 10/2017 | Kaletsky | H04L 51/02 |
| 2018/0115825 A1* | 4/2018 | Milne | H04B 10/116 |
| 2019/0362149 A1* | 11/2019 | Mukhopadhyay | |
| | | | G06K 9/00671 |

OTHER PUBLICATIONS

"Research on Computer Software Development Technology," publisher unknown, (before Mar. 3, 2021), (3 pages).

* cited by examiner

INTEGRATED FACIAL RECOGNITION METHOD AND SYSTEM

CROSS-REFERENCE TO RELATED APPLICATIONS

This application claims priority to Chinese Patent Application No. 201710811916.9, filed with the State Intellectual Property Office of the People's Republic of China (SIPO) on Sep. 11, 2017, the content of which is incorporated herein by reference in its entirety.

TECHNICAL FIELD

The disclosure relates to the computer field, specifically to the computer vision field, and more specifically to an integrated facial recognition method and system.

BACKGROUND

Facial recognition technology is a widely applied artificial intelligence technology. When developing a facial recognition application, a facial recognition service can be used to simplify the development process. At present, the facial recognition service usually uses the following framework: providing a model associated with facial recognition, and APIs (application programming interfaces) and SDKs (software development kits) of operations, and purchasing a computer hardware resource for executing model training and building a desired environment for the model training by a user.

On the one hand, the source codes of the API and the SDK are not available to the users, resulting in the user's inability to optimize a model based on the model's training effects. On the other hand, the time and labor costs are high, and the development process is complex.

SUMMARY

The disclosure provides an integrated facial recognition method and system, to solve the technical problems existing in the background part.

In a first aspect, the disclosure provides an integrated facial recognition method. The method includes: receiving a request for acquiring an integrated facial recognition service sent by a user terminal. The request for acquiring the integrated facial recognition service includes: an identifier of a user-selected model associated with facial recognition of the user, and an identifier of an operation selected by the user from candidate operations. The candidate operations include: a training operation and a predicting operation. A type of the user-selected model associated with the facial recognition of the user is one of following: a facial feature point extraction type, a face detection type, a face alignment type, and a facial recognition type. The method further includes: executing distributedly an operation selected by the user from the candidate operations on the user-selected model associated with the facial recognition of the user to obtain an operation result, and storing the operation result.

In a second aspect, the disclosure provides an integrated facial recognition system. The system includes: a receiving unit, configured for receiving a request for acquiring an integrated facial recognition service sent by a user terminal. The request for acquiring the integrated facial recognition service includes: an identifier of a user-selected model associated with facial recognition of the user, and an identifier of an operation selected by the user from candidate operations. The candidate operations include: a training operation and a predicting operation. A type of the user-selected model associated with the facial recognition of the user is one of following: a facial feature point extraction type, a face detection type, a face alignment type, and a facial recognition type. The system further includes: a processing unit, configured for executing distributedly an operation selected by the user from the candidate operations on the user-selected model associated with the facial recognition of the user to obtain an operation result, and storing the operation result.

facial recognition By receiving a request for acquiring an integrated facial recognition service sent by a user terminal, the request for acquiring the integrated facial recognition service including: an identifier of a user-selected model associated with facial recognition of the user, and an identifier of an operation selected by the user from candidate operations, the candidate operations including: a training operation and a predicting operation, A type of the user-selected model associated with the facial recognition of the user being one of following: a facial feature point extraction type, a face detection type, a face alignment type, and a facial recognition type; executing distributedly an operation selected by the user from the candidate operations on the user-selected model associated with the facial recognition of the user to obtain an operation result, and storing the operation result, the integrated facial recognition method and system provided by the present disclosure realized completing the operations such as training a model or developing a facial recognition application, by using hardware resources and an established software environment provided by a server to meet the needs associated with facial recognition without the need of buying hardware and establishing a software environment by the user, thereby saving the development cost and improving the convenience of using the facial recognition service.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
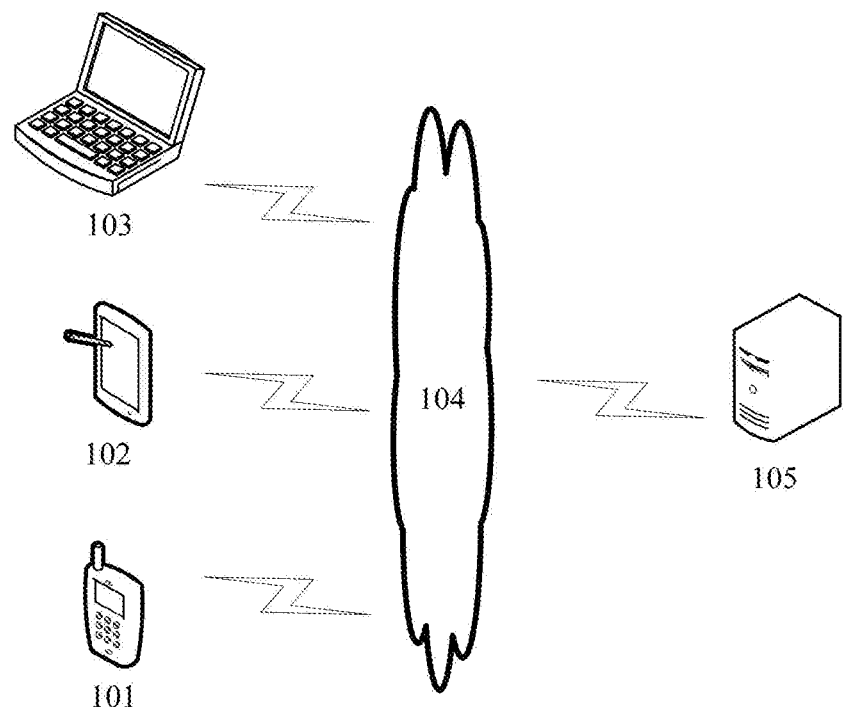
FIG. 1 shows an illustrative system architecture in which an integrated facial recognition method or system according to the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The terminal devices 101, 102 and 103 may interact with the server 105 through the network 104, in order to transmit or receive messages, etc. Various communication client applications, such as cloud storage applications, shopping applications, search applications, instant messaging tools, mailbox clients, and social platform software may be installed on the terminal devices 101, 102 and 103.

The server 105 may be a server providing an integrated facial recognition service satisfying various demands related to the facial recognition. The integrated facial recognition service includes providing hardware resources and a software environment requested by the training of the facial recognition model and developing of the facial recognition application.

The terminals 101, 102 and 103 may install and use the client terminal of the integrated facial recognition service provide by the server 105. The terminals 101, 102 and 103 may send to the server 105 a request for the integrated facial recognition service.

Figure 2:
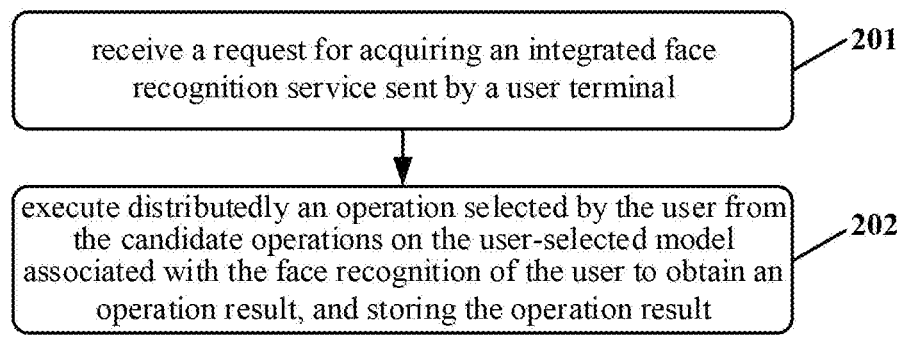
FIG. 2 shows a flow chart of an integrated facial recognition method according to an embodiment of the present disclosure.

Please refer to FIG. 2, which shows a flow of an integrated facial recognition method according to an embodiment of the present disclosure. The integrated facial recognition method provided by the embodiment of the present disclosure may be executed by a server (for example, a server 105 in FIG. 1). The method includes:

Step 201: receiving a request for acquiring an integrated facial recognition service sent by a user terminal.

In the present embodiment, the request for acquiring an integrated facial recognition service sent by a user terminal may be received by a server providing the integrated facial recognition service. When a user needs to use the facial recognition service, a request for acquiring the facial recognition service can be sent to the server through a user terminal.

The request for acquiring the facial recognition service may include, but is not limited to: an identifier of a user, an identifier of a user-selected model associated with facial recognition of the user, and an identifier of an operation selected by the user from candidate operations. The candidate operations include: a training operation and a predicting operation. A type of the user-selected model associated with the facial recognition of the user belongs to one of following types: a facial feature point extraction type, a face detection type, a face alignment type, and a facial recognition type.

In the present embodiment, the user-selected model associated with facial recognition of a user may be a model that is associated with the facial recognition, corresponds to the user, and is trained by the user using an integrated facial recognition service, and may also be a model trained by the user using the integrated facial recognition service for the first time. The user can select a model associated with facial recognition from a plurality of models associated with the facial recognition of the user and trained by the user using the integrated facial recognition service, and retrain or predict the selected model.

In the present embodiment, a user can first log in when the user needs to use the facial recognition service. For example, a user terminal can send a request for acquiring a page to a server, and the server returns the login page of the facial recognition service to the user terminal. The user can first enter the user account number and password on the login page of the facial recognition service. After successfully logging in, the server can send the page of the integrated facial recognition service to the user. The page of the integrated facial recognition service contains:

a model associated with the facial recognition of the user and trained by the user using the integrated facial recognition service, a facial feature point extraction type, a face detection type, a face alignment type, a facial recognition type, a creation button corresponding to the facial recognition type, and a button corresponding to a training data set. The user can click creation buttons corresponding to the facial feature point extraction type, the face detection type, the face alignment type, and the facial recognition type, create models associated with the facial recognition of the facial feature point extraction type, the face detection type, the face alignment type, and the facial recognition type of the user, and use the created models associated with the facial recognition of the facial feature point extraction type, the face detection type, the face alignment type, and the facial recognition type of the user as the user-selected models associated with the facial recognition of the user.

In the present embodiment, a plurality of training data sets can be stored in a Hadoop Distributed File System (HDFS). For example, the training data sets covering different age grades and different regions, such as CelebFaces, Faces in the Wild, FaceScrub, WebFace and MS Data-Face, can be stored. Furthermore, Labeled Faces in the Wild (LWF) and Face Detection Data Set and Benchmark (FDDB) may be stored for model evaluation.

In the present embodiment, a user terminal can send a request for remote login to a server to realize remote login of a user after passing a validation by the server, and then the user can enter an instruction at the terminal to call the server program.

Step 202: executing distributedly an operation selected by the user from the candidate operations on the user-selected model associated with the facial recognition of the user to obtain an operation result, and storing the operation result.

In the present embodiment, after receiving a request for acquiring an integrated facial recognition service sent by a user terminal in the step 201, an operation, such as a training operation and a predicting operation, selected by the user from the candidate operations may be executed distributedly on the user-selected model associated with the facial recognition of the user to obtain an operation result, such as a training result and a prediction result, and storing the operation result.

In some optional implementations of the present embodiment, when a user executes a training operation on a selected model using the integrated facial recognition service, the operation selected by the user from the candidate operations is the training operation, and the request for acquiring the integrated facial recognition service received by the server further includes: an identifier of the user-selected training data set. After receiving the request for acquiring the integrated facial recognition service, the server may read the training data set corresponding to the identifier of the user-selected training data set and the current training program corresponding to the user-selected model associated with the facial recognition of the user from a distributed file system. Then, the training operation may be executed distributedly on the user-selected model associated with the facial recognition of the user using the current training program of the user-selected model associated with the facial recognition of the user based on the user-selected training data set, to obtain a trained user-selected model associated with the facial recognition of the user and a model parameter; and the trained user-selected model associated with the facial recognition of the user and the model parameter may be stored in the distributed file system.

In some optional implementations of the embodiment, when a user executes a predicting operation on a selected model using an integrated facial recognition service, the operation selected by the user from the candidate operations is the predicting operation. After receiving the request for acquiring the integrated facial recognition service, the server may read a current predicting program of the user-selected model associated with the facial recognition of the user from the distributed file system. Then, the predicting operation is executed distributedly on a to-be-predicted data set using the current predicting program to obtain a prediction result, and the prediction result is stored in the distributed file system.

The server may respectively pre-store training programs and predicting programs of a type of model associated with the facial recognition and developed using a plurality of different development frameworks. The development frameworks may include, but are not limited to: Caffe, Tensorflow, OpenCV and Tesseract-OCR. Training programs and predicting programs of models associated with the facial recognition, such as the face detection type, the facial feature point extraction type, the face alignment type, and the facial recognition type, may be pre-developed respectively using the development frameworks, such as Caffe, Tensorflow, OpenCV and Tesseract-OCR.

In some optional implementations of the present embodiment, each operation code associated with the facial recognition is encapsulated respectively as an API. Thus, the user can develop the facial recognition application based on each of the API corresponding to the operation associated with the facial recognition. The operation associated with the facial recognition may include, but is not limited to: a user image registration operation, a face life photo validation, a life photo and ID photo matching, a facial recognition operation, and an operation of calling a trained model associated with the facial recognition.

A user terminal may send a request for remote login to a server to realize remote login of a user after passing the validation by the server, and after remote login, the user can enter an instruction at the terminal to call an integrated development environment of the server. The integrated development environment will be presented to the user at the terminal. Because of remote login of the user, the server can acquire a user-entered code in the integrated development environment. The user may enter a code of a facial recognition application written based on the API corresponding to the operation associated with the facial recognition in the integrated development environment, whereby the server can acquire the user-written code of the facial recognition application of the user, and directly develop the facial recognition application on the server. The developed facial recognition application can run on the server to test a running effect of the facial recognition application. After passing the test, the facial recognition application can be used for facial recognition.

In some optional implementations of the present embodiment, the user-written codes of a training program and a predicting program of a model associated with facial recognition of the user may be acquired; and the training program and the predicting program may be used as the current training program and predicting program of the model associated with the facial recognition of the user.

The user can view the code of the trained model associated with the facial recognition of the user obtained by the user through training the model associated with the facial recognition using the integrated facial recognition service. A button for viewing the code of the model on a page of the facial recognition service can be clicked, and the user terminal sends a request to the server. The request includes a user identifier. The server can send the code of the trained model associated with the facial recognition to the terminal.

The user terminal may send a request for remote login to the server to realize remote login of the user after passing the validation by the server, and after remote login, the user can enter an instruction at the terminal to call an integrated development environment of the server. The integrated development environment will be presented to the user at the terminal. Because of remote login of the user, the server can acquire a user-entered code in the integrated development environment. The user can enter the codes of the training program and the predicting program of the model associated with the facial recognition of the user in the integrated development environment. The training program and the predicting program of the model associated with the facial recognition of the user are the training program and the predicting program of the trained model associated with the facial recognition obtained by the user through training the model associated with the facial recognition using the integrated facial recognition service. The server can acquire the user-written codes of the training program and the predicting program of the model associated with the facial recognition of the user, and use the training program and the predicting program as the current training program and predicting program of the model associated with the facial recognition of the user. Thus, optimization of the model associated with the facial recognition of the user may be completed directly by the server.

In some optional implementations of the present embodiment, when a user needs to download a model associated with facial recognition of the user, a request for downloading the model sent by a user terminal can be received. The request for downloading the model includes the identifier of the model associated with the facial recognition of the user. The model associated with the facial recognition of the user can be sent to the terminal.

Figure 3:
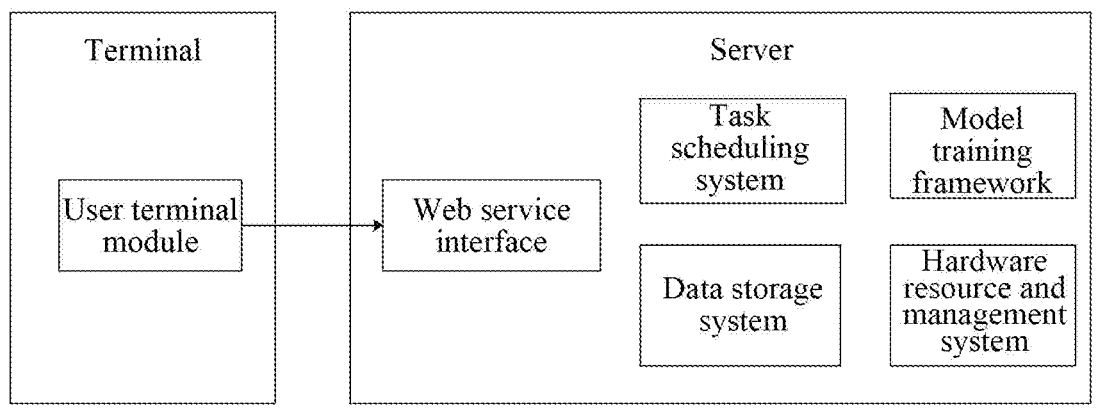
FIG. 3 shows an illustrative architecture suitable for implementing an integrated facial recognition method according to the present disclosure.

Referring to FIG. 3, which shows an illustrative architecture suitable for implementing an integrated facial recognition method according to the present disclosure.

FIG. 3 shows a hardware resource and management system, a data storage system, a model training framework, a task scheduling system, a web service interface and a user terminal module.

The hardware resource and management system include: a CPU, a memory, a hard disk, and a GPU. A visual monitoring system of the CPU and GPU has been realized. The GPU monitoring system can view an average service condition of monitoring requirements of a cluster, and can view historical average service condition by selecting a time period. An operation and maintenance engineer can know about details of each element through the cluster display page. The cluster display page may include, but is not limited to, Hosts up, CPUs total, GPUs total, a last hour GPU usage curve, a last hour network usage curve, a card GPU usage curve of a last hour machine, a video memory usage curve of a last hour GPU, and a last hour memory usage curve.

The data storage system implements a distributed storage function based on HDFS training data, prediction data and model parameters. It can directly access to a distributed file system, upload and download a sample data set, a training result set, and the training model.

The model training framework can use a deep learning calculation framework (Tensorflow framework), using a default GPU version to improve the calculation speed and performance. A CPU version is also pre-installed for use in a special scenario of facial recognition. The facial recognition includes face detection, facial feature point extraction, face alignment, facial recognition and other operations. For each operation, an corresponding algorithm is provided. For face detection, a deep convolutional network framework (FASTER-RCNN framework), a YOLO framework, and a multi-task convolutional neural networks (MTCNN) framework may be provided. For facial feature point extraction, a CNN-based deep learning network, such as FaceNet and Deepid for facial recognition, may be provided. The training program and a predicting program of the model required in the facial recognition process may be developed based on TensorFlow.

The task scheduling system is implemented based on TensorFlow on YARN (yet another resource coordinator) framework. Because a task in a cluster runs in the YARN by way of an Application, Application types in the YARN can be extended to implement a TensorFlow Application Master, thereby implementing the distributed execution on the TensorFlow program developed based on TensorFlow for training or predicting a model. Resource scheduling types of the YARN can be extended. Statistics, scheduling and isolation of GPU resources are supported. The TensorFlow program runs in a Docker container to realize personalization and isolation of the execution environment. Parameters required for the TensorFlow program are transparently transmitted to a user-specified executive instruction through AM of the YARN. Reading from and writing in a HDFS in the TensorFlow program are supported. The training data and training result of the TensorFlow program can be specified as a HDFS path. Viewing the running state of the TensorFlow program in a TensorBoard is supported. During execution of the TensorFlow program, the execution result of the TensorFlow program is uploaded to the HDFS, the TensorBoard detects the HDFS path in real time, and dynamically displays a current running state of each TensorFlow program.

The web service interface provides an interface associated with a facial recognition scenario, and may include, but is not limited to: interfaces for registration, updating, deletion, authentication, life photo and ID photo matching, facial recognition, user information query, user group addition, deletion, modification and viewing.

The user terminal module provides a SDK implemented using different development languages in different operating systems, such as Android and IOS, writes a code using the SDK to call a web service interface, and develops facial recognition applications satisfying different facial recognition scenarios.

Figure 4:
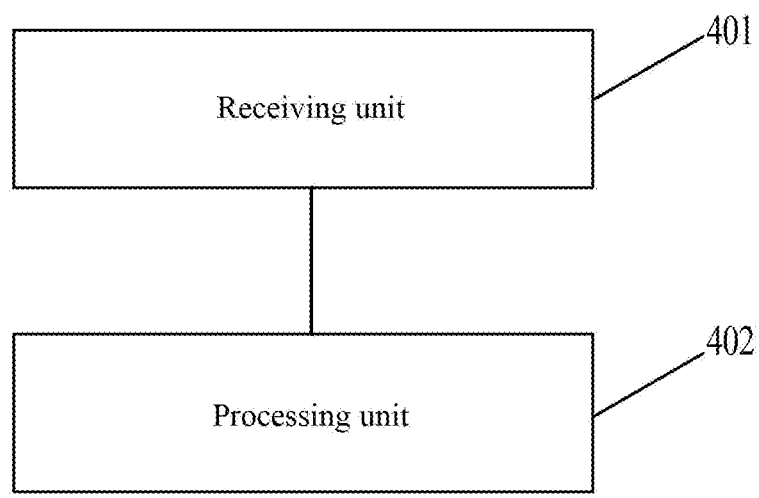
FIG. 4 shows a schematic diagram of a structure of an integrated facial recognition system according to an embodiment of the present disclosure.

Please further refer to FIG. 4. As implementations of the methods shown in the above figures, the disclosure provides an embodiment of an integrated facial recognition system. The embodiment of the system corresponds to the embodiment of the method shown in FIG. 2, and the system may be specifically applied to a variety of electronic devices.

As shown in FIG. 4, the integrated facial recognition system according to the present embodiment includes: a receiving unit 401, and a processing unit 402. The receiving unit 401 is configured for receiving a request for acquiring an integrated facial recognition service sent by a user terminal. The request for acquiring the integrated facial recognition service includes: an identifier of the user-selected model associated with facial recognition of the user, and an identifier of an operation selected by the user from candidate operations. The candidate operations include: a training operation and a predicting operation. A type of the user-selected model associated with the facial recognition of the user is one of following types: a facial feature point extraction type, a face detection type, a face alignment type, and a facial recognition type. The processing unit 402 is configured for executing distributedly an operation selected by the user from the candidate operations on the user-selected model associated with the facial recognition of the user to obtain an operation result, and storing the operation result.

In some optional implementations of the present embodiment, the processing unit 402 includes: a training subunit, configured for reading, when the operation selected by the user from the candidate operations is the training operation, and the request for acquiring the integrated facial recognition service further includes an identifier of a user-selected training data set, a training data set corresponding to the identifier of the user-selected training data set and a current training program corresponding to the user-selected model associated with the facial recognition of the user from a distributed file system; executing distributedly the training operation on the user-selected model associated with the facial recognition of the user using the current training program based on the training data set to obtain a trained user-selected model associated with the facial recognition of the user and a model parameter; and storing the trained user-selected model associated with the facial recognition of the user and the model parameter in the distributed file system.

In some optional implementations of the present embodiment, the processing unit 402 includes: a prediction subunit, configured for reading, when the operation selected by the user from the candidate operations is the predicting operation, a current predicting program corresponding to the user-selected model associated with the facial recognition of the user from a distributed file system; executing distributedly the predicting operation on a to-be-predicted data set using the current predicting program to obtain a prediction result; and storing the prediction result in the distributed file system.

In some optional implementations of the present embodiment, the integrated facial recognition system further includes: an encapsulation unit, configured for encapsulating each operation code associated with the facial recognition respectively as an application programming interface.

In some optional implementations of the embodiment, the integrated facial recognition system further includes: a development unit, configured for acquiring a user-written code of a facial recognition application based on an application programming interface; and establishing correspondence between the facial recognition application and a user identifier of the user.

In some optional implementations of the present embodiment, the integrated facial recognition system further includes: an optimization unit, configured for acquiring user-written codes of a training program and a predicting program of a model associated with facial recognition of a user; and using the training program and the predicting program as the current training program and predicting program of the model associated with the facial recognition of the user.

In some optional implementations of the present embodiment, the integrated facial recognition system further includes: a downloading unit, configured for receiving a request for downloading a model sent by a user terminal, the request for downloading the model including: an identifier of the model associated with facial recognition of a user; and sending the model associated with the facial recognition of the user to the terminal.

Figure 5:
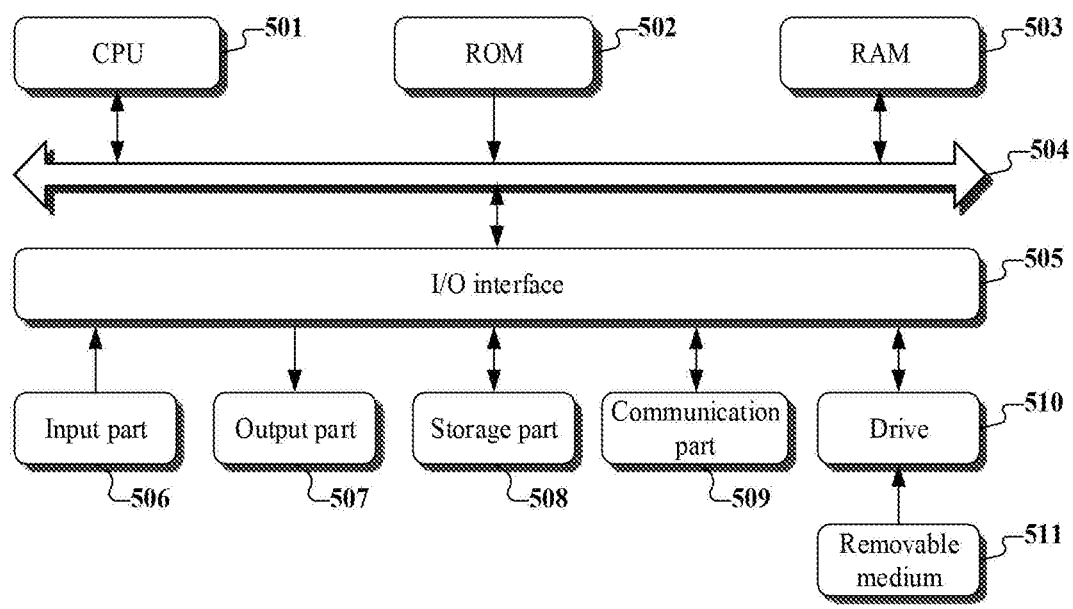
FIG. 5 is a schematic diagram of a structure of a computer system suitable for implementing a server according to an embodiment of the present disclosure.

FIG. 5 shows a schematic diagram of a structure of a computer system suitable for implementing a server according to an embodiment of the present disclosure. The server shown in FIG. 5 is only an example, and should not limit the functions and scope of application of the embodiments of the disclosure in any way.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506; an output portion 507; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to the embodiments of the present disclosure, the process described above may be implemented in a computer software program. For example, an embodiment of the present disclosure includes a computer program product embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the abovementioned functionalities as defined by the methods of the present disclosure.

The present disclosure further discloses a server, the server is equipped with one or more processors, and a memory for storing one or more operations described in steps 201-202, the one or more programs enable. When the one or more programs are executed by the one or more processors, the one or more processors to implement the operations described in steps 201-202.

The present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: receiving a request for acquiring an integrated facial recognition service sent by a user terminal, the request for acquiring the integrated facial recognition service comprising: an identifier of a user-selected model associated with facial recognition of the user, and an identifier of an operation selected by the user from candidate operations, the candidate operations comprising: a training operation and a predicting operation, a type of the user-selected model associated with the facial recognition of the user's being one of the following: a facial feature point extraction type, a face detection type, a face alignment type, and a facial recognition type; and executing distributedly an operation selected by the user from the candidate operations on the user-selected model associated with the facial recognition of the user to obtain an operation result, and storing the operation result.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, comprising a receiving unit, and a processing unit, where the names of these units or modules do not in some cases constitute a limitation to such units or modules themselves. For example, the receiving unit may also be described as "a unit for receiving a request for acquiring the integrated facial recognition service sent by the user terminal."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. An integrated facial recognition method, comprising:
receiving a request for acquiring an integrated facial recognition service sent by a user terminal, the request for acquiring the integrated facial recognition service comprising: an identifier of a user-selected model associated with facial recognition of a user, and an identifier of an operation selected by the user from candidate operations, the candidate operations comprising: a training operation and a predicting operation, the user-selected model associated with the facial recognition of the user being selected from a plurality of models associated with the facial recognition of the user, the plurality of models associated with the facial recognition of the user comprising: a facial feature point extraction type model, a face detection type model, a face alignment type model, and a facial recognition type model;
executing distributedly the operation selected by the user from the candidate operations on the user-selected model associated with the facial recognition of the user to obtain an operation result, and storing the operation result; and
encapsulating each of a plurality of operation codes associated with the facial recognition respectively as an application programming interface to enable the user to enter a code of a facial recognition application written by the user in an integrated development environment, the plurality of operation codes including any two or more codes corresponding to a user image registration operation, a face life photo validation, or a life photo and ID photo matching.

2. The method according to claim 1, wherein the operation selected by the user from the candidate operations is the training operation, and the request for acquiring the integrated facial recognition service further comprises an identifier of a user-selected training data set; and
the executing distributedly the operation selected by the user from the candidate operations on the user-selected model associated with the facial recognition of the user comprises:
reading, from a distributed file system, a training data set corresponding to the identifier of the user-selected training data set and a current training program corresponding to the user-selected model associated with the facial recognition of the user;
executing distributedly the training operation on the user-selected model associated with the facial recognition of the user using the current training program based on the training data set, to obtain a trained user-selected model associated with the facial recognition of the user and a model parameter; and
storing the trained user-selected model associated with the facial recognition of the user and the model parameter in the distributed file system.

3. The method according to claim 1, wherein the operation selected by the user from the candidate operations is the predicting operation; and
the executing distributedly the operation selected by the user from the candidate operations on the user-selected model associated with the facial recognition of the user comprises:
reading, from a distributed file system, a current predicting program corresponding to the user-selected model associated with the facial recognition of the user;
executing distributedly the predicting operation on a to-be-predicted data set using the current predicting program to obtain a prediction result; and
storing the prediction result in the distributed file system.

4. The method according to claim 1, further comprising:
acquiring the code of a facial recognition application written by the user based on the application programming interface; and
establishing correspondence between the facial recognition application and a user identifier of the user.

5. The method according to claim 4, further comprising:
acquiring user-written codes of a training program and a predicting program of the user-selected model associated with the facial recognition of the user; and
using the training program as a current training program and the predicting program as a current predicting program of the user-selected model associated with the facial recognition of the user.

6. The method according to claim 5, further comprising:
receiving a request for downloading a model sent by the user terminal, the request for downloading the model comprising the identifier of the user-selected model associated with the facial recognition of the user; and
sending the model to the terminal.

7. An integrated facial recognition system, comprising:
at least one processor; and
a memory storing instructions, the instructions when executed by the at least one processor, cause the at least one processor to perform operations, the operations comprising:
receiving a request for acquiring an integrated facial recognition service sent by a user terminal, the request for acquiring the integrated facial recognition service comprising: an identifier of a user-selected model associated with facial recognition of a user, and an identifier of an operation selected by the user from candidate operations, the candidate operations comprising: a training operation and a predicting operation, a type of the user-selected model associated with the facial recognition of the user being selected from a plurality of models associated with the facial recognition of the user, the plurality of models associated with the facial recognition of the user comprising: a facial feature point extraction type model, a face detection type model, a face alignment type model, and a facial recognition type model;

executing distributedly the operation selected by the user from the candidate operations on the user-selected model associated with the facial recognition of the user to obtain an operation result, and storing the operation result; and encapsulating each of a plurality of operation codes associated with the facial recognition respectively as an application programming interface to enable the user to enter a code of a facial recognition application written by the user in an integrated development environment, the plurality of operation codes including any two or more codes corresponding to a user image registration operation, a face life photo validation, or a life photo and ID photo matching.

8. The system according to claim 7, wherein the operation selected by the user from the candidate operations is the training operation, and the request for acquiring the integrated facial recognition service further comprises an identifier of a user-selected training data set, the executing distributedly the operation selected by the user from the candidate operations on the user-selected model associated with the facial recognition of the user comprises:

reading, from a distributed file system, a training data set corresponding to the identifier of the user-selected training data set and a current training program corresponding to the user-selected model associated with the facial recognition of the user;

executing distributedly the training operation on the user-selected model associated with the facial recognition of the user using the current training program based on the training data set, to obtain a trained user-selected model associated with the facial recognition of the user and a model parameter; and storing the trained user-selected model associated with the facial recognition of the user and the model parameter in the distributed file system.

9. The system according to claim 7, wherein the operation selected by the user from the candidate operations is the predicting operation, the executing distributedly the operation selected by the user from the candidate operations on the user-selected model associated with the facial recognition of the user comprises:

reading, from a distributed file system, a current predicting program corresponding to the user-selected model associated with the facial recognition of the user;

executing distributedly the predicting operation on a to-be-predicted data set using the current predicting program to obtain a prediction result; and storing the prediction result in the distributed file system.

10. A non-transitory computer readable storage medium storing a computer program, wherein the computer program, when executed by a processor, cause the processor to perform operations, the operations comprising:

receiving a request for acquiring an integrated facial recognition service sent by a user terminal, the request for acquiring the integrated facial recognition service comprising: an identifier of a user-selected model associated with facial recognition of a user, and an identifier of an operation selected by the user from candidate operations, the candidate operations comprising: a training operation and a predicting operation, a type of the user-selected model associated with the facial recognition of the user being selected from a plurality of models associated with the facial recognition of the user, the plurality of models associated with the facial recognition of the user comprising: a facial feature point extraction type model, a face detection type model, a face alignment type model, and a facial recognition type model;

executing distributedly the operation selected by the user from the candidate operations on the user-selected model associated with the facial recognition of the user to obtain an operation result, and storing the operation result; and encapsulating each of a plurality of operation codes associated with the facial recognition respectively as an application programming interface to enable the user to enter a code of a facial recognition application written by the user in an integrated development environment, the plurality of operation codes including any two or more codes corresponding to a user image registration operation, a face life photo validation, or a life photo and ID photo matching.

* * * * *